Patented Mar. 21, 1933

1,901,890

UNITED STATES PATENT OFFICE

GEORGE E. BARNHART, OF NEW BRIGHTON, AND HARRY E. PFAFF, OF WARREN, PENNSYLVANIA, ASSIGNORS TO JAMES M. GUTHRIE AND WILLIAM B. WHARTON, TRUSTEES, BOTH OF PITTSBURGH, PENNSYLVANIA

CEMENTITIOUS COMPOSITION

No Drawing. Application filed May 2, 1928. Serial No. 274,672.

This invention relates to a cementitious material, and to a solution for use in making such cementitious material.

The object of the invention is to produce a cementitious mixture which upon drying will have a dense and glazed surface, thus entirely preventing the subsequent entrance of moisture into the body of the cementitious material, and presenting an attractive surface capable of taking a high polish.

The word "cement", throughout the specification means a hydraulic cement, such as commercial Portland cement, and by the words "cementitious material" is intended a material which has hydraulic cement as the principal cementitious component of the mix.

Primarily the invention consists in preparing a solution of certain chemical substances, and in utilizing this solution in a desirable concentration as the mixing water for the solid constituents of the cementitious material. In developing the composition we have avoided the use of calcium chloride, which is considered by many to be detrimental when present in any amount in a cementitious mixture.

As the result of numerous experiments and tests we have selected a preferred formula, which is desirable because of its simplicity, because of the hardness and impenetrability of the glaze formed by it, and because of the durability both of the glaze and of the cementitious material as a whole in which the mixture is incorporated. By further experiments and tests we have discovered a number of substitute ingredients which may be used in the place of various members constituting our preferred or key formula. With these substitutions highly desirable results may still be obtained. The preferred formula is as follows:

| | Part by volume |
|---|---|
| Aluminum sulphate | 1 |
| Magnesium sulphate | 1 |
| Sodium sulphate | 1 |
| Potassium sulphate | 1 | or

| | Parts by volume |
|---|---|
| Aluminum sulphate | 1 |
| Magnesium sulphate | 1 |
| Potassium sulphate | 2 |

In making the solution, thirty volumes of water are taken for each volume of chemical, it being understood that the chemicals are in solid state but in finely divided form for the purpose of this apportionment. In the preferred formula given above, it may be stated that 4 fluid ounces of the four chemicals are added to 120 fluid ounces of water.

Whereas two lists are given, one containing four substances and the other three, these two constitute in reality only one formula. This is for the reason that potassium sulphate is preferable because of its ready solubility, but it is a more expensive ingredient than the sodium sulphate. For reasons of economy, therefore, it is in general desirable to substitute sodium sulphate for some proportion of the potassium sulphate.

In making up a cementitious material, cement with sand, or other suitable filling material, is mixed in the desired proportion with the special solution. With this mixing water suitable concrete coloring, such as cobalt coloring, may be added if so desired.

When the mix has been made, it is placed in a suitable mold. As the moisture in the mix rises to the upper surface of the body, and before the mix has set, the upper surface of the body may be smoothed over, or may be roughened to furnish the appearance of a tapestry brick.

It will be noted that this upper surface has a glassy appearance even while still in a liquid condition. After the glaze has hardened, the surface acquires its waterproof qualities, and may if desired be subjected to a polishing operation. It is found that the glaze, with respect to its hardness and impenetrability by water, is improved by seasoning. That is, the brick, tile, or other block, should desirably be submitted to an air drying for from eight to twelve days before its use. It may also be noted that the waterproofing properties of the material continue to improve with the passage of time during a relatively long period.

It should be particularly noted that the material need be subjected to an air drying only, without baking, or the application of heat in any manner. It is necessary that it be maintained at a temperature above the freezing point and desirable that it be maintained at a normal room temperature of from sixty to seventy degrees Fahrenheit during drying. It is further a fact that the glazed surface is coherent with the remainder of the body, and does not merely form a skin on the surface thereof, and that the vitreous effect of the glaze is present in some degree throughout the entire body. The glaze itself is insoluble in water, weak acids or other solvent liquids to which it might ordinarily be subjected.

The material mixed with the solution may be used in making up bricks, blocks, or tiles. It may also, however, be utilized in many other connections, such as in roadways, retaining walls and other massive concrete work. In these connections it presents the obvious advantage of preventing sweating in the walls of a dwelling, and avoids the destruction of concrete from freezing due to the fact that its surface is impervious to water.

Several modified, or alternative, formulae may be used instead of the preferred, or key, formula given above. With each of these alternative formulae, it is to be understood that thirty parts of water are to be used for each volume of chemical.

According to the first modified formula, the magnesium sulphate is replaced by iron sulphate, and the potassium sulphate by potassium chloride. The amount of sodium sulphate is also increased. This alternative formula reads as follows:

Parts by volume

| | |
|---|---|
| Sodium sulphate | 2 |
| Potassium chloride | 1 |
| Iron sulphate | 1 |
| Aluminum sulphate | 1 |

According to the second alternative formula the potassium chloride of the formula immediately preceding is omitted, and the amount of aluminum sulphate used is increased. This formula reads as follows:

Parts by volume

| | |
|---|---|
| Sodium sulphate | 2 |
| Aluminum sulphate | 2 |
| Magnesium sulphate | 1 |

The third alternative formula also comprises the salts of the same metals, with the exception that a zinc salt is introduced. This third alternative formula is as follows:

Parts by volume

| | |
|---|---|
| Sodium sulphate | 2 |
| Zinc sulphate | 2 |
| Potassium chloride | 4 |
| Magnesium chloride | 1 |

The fourth modified formula comprises sulphates of the same two metals as those appearing in the key formula, together with salts of the same two alkali metals as in the key formula. The salts of these alkali metals are, however, a silicate and a chloride instead of the sulphates noted above. This formula is as follows:

Parts by volume

| | |
|---|---|
| Sodium silicate | 1 |
| Aluminum sulphate | 1 |
| Potassium chloride | 1 |
| Magnesium sulphate | 1 |

As stated in connection with the first formula, it should be considered throughout that potassium salts and sodium salts are substantially identical in their effect. The appreciable difference between them is chiefly in their degree of solubility in water.

What I claim is:

1. A glaze forming and waterproofing composition for cementitious material comprising a sulphate of an alkali metal, aluminum sulphate, and magnesium sulphate.

2. A glaze forming and waterproofing composition for cementitious material comprising potassium sulphate, aluminum sulphate, and magnesium sulphate.

3. A glaze forming and waterproofing composition for cementitious material comprising potassium sulphate, sodium sulphate, aluminum sulphate, and magnesium sulphate.

4. A glaze forming and waterproofing solution for use in cementitious material comprising potassium sulphate, sodium sulphate, aluminum sulphate, magnesium sulphate, and water, the combined volume of the chemicals in finely divided form being approximately equal to one-thirtieth of the volume of the water.

5. A glaze forming and waterproofing composition for cementitious material comprising a sulphate of an alkaline metal, aluminum sulphate, magnesium sulphate, and water, the combined volume of the chemicals in finely divided form being equal to at least one-sixtieth of the volume of the water.

6. A glaze forming and waterproofing solution for cementitious materials comprising potassium sulphate, aluminum sulphate, magnesium sulphate, and water, the combined volume of chemicals in finely divided form being equal to at least one-sixtieth of the volume of the water.

7. A glaze forming and waterproofing solution for cementitious materials comprising a potassium sulphate, sodium sulphate, aluminum sulphate, magnesium sulphate, and water, the combined volume of chemicals in finely divided form being equal to at least one-sixtieth of the volume of the water.

In witness whereof, we hereunto set our hands.

GEORGE E. BARNHART.
HARRY E. PFAFF.